United States Patent

[11] 3,589,463

[72] Inventor Robert W. Stowers
 7115 North Barnett Lane, Milwaukee, Wis. 53217
[21] Appl. No. 854,924
[22] Filed Sept. 3, 1969
[45] Patented June 29, 1971

[54] DUAL BELT VEHICLE
 16 Claims, 10 Drawing Figs.
[52] U.S. Cl................................................... 180/5 R,
 74/231 MB, 180/9.24 R, 305/35 EB
[51] Int. Cl........................................................B62m 27/02
[50] Field of Search............................................ 115/1, 63,
 64; 180/9.24, 5, 9.2; 305/35 EB, 38, 34

[56] References Cited
UNITED STATES PATENTS
2,373,316 4/1945 Landy .......................... 180/9.24 X
3,131,781 5/1964 Van Slyke .................... 180/9.24 X
3,168,069 2/1965 Everest ......................... 115/1
3,474,751 10/1969 Hebert .......................... 180/5 X Primary Examiner—Richard J. Johnson
Attorneys—Arthur H. Seidel and Allan W. Leiser ABSTRACT: A vehicle propelled by two endless belts, one on each side of the machine, that pass around rolls at the front and rear of the machine. A pair of rolls at the front have canted axes, in a vertical, transverse plane, that are downwardly convergent, and a pair of rolls at the rear have canted axes, also in a vertical, transverse plane, that are upwardly convergent. Each belt passes between and around a front roll and a rear roll, and is in the form of a moebius with the twist of the moebius in the upper run of the belt. A prime mover is mounted toward the rear of the machine between the two belts and is in driving connection with the rear rolls. An upper deck includes a seat located over the prime mover and is provided with footboards at the front sides, so that the operator sits astraddle the machine and through controls on handrails beside the seat is able to maneuver it at desired speed.

INVENTOR
ROBERT W. STOWERS

BY Arthur H. Seidel

ATTORNEY

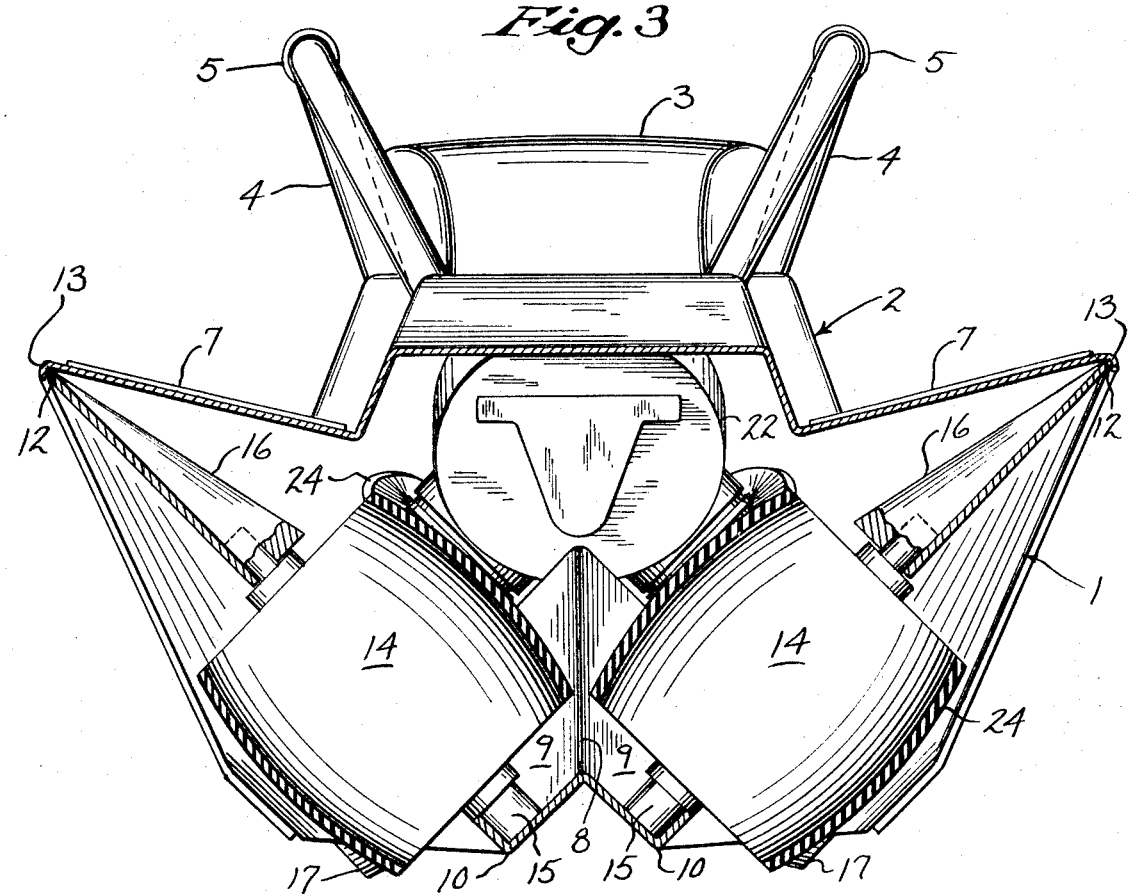
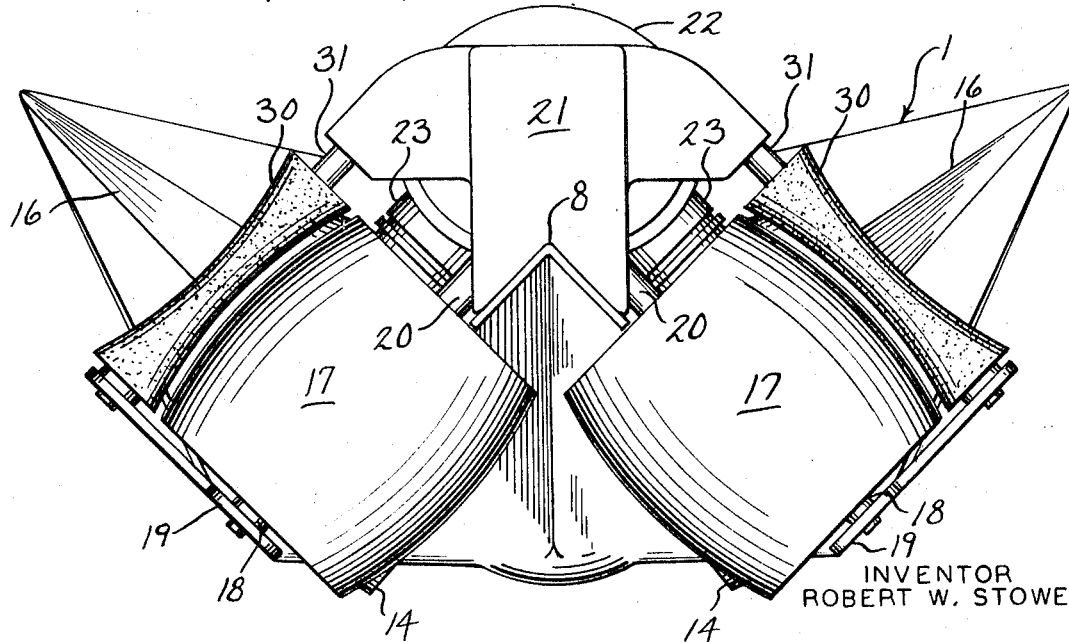

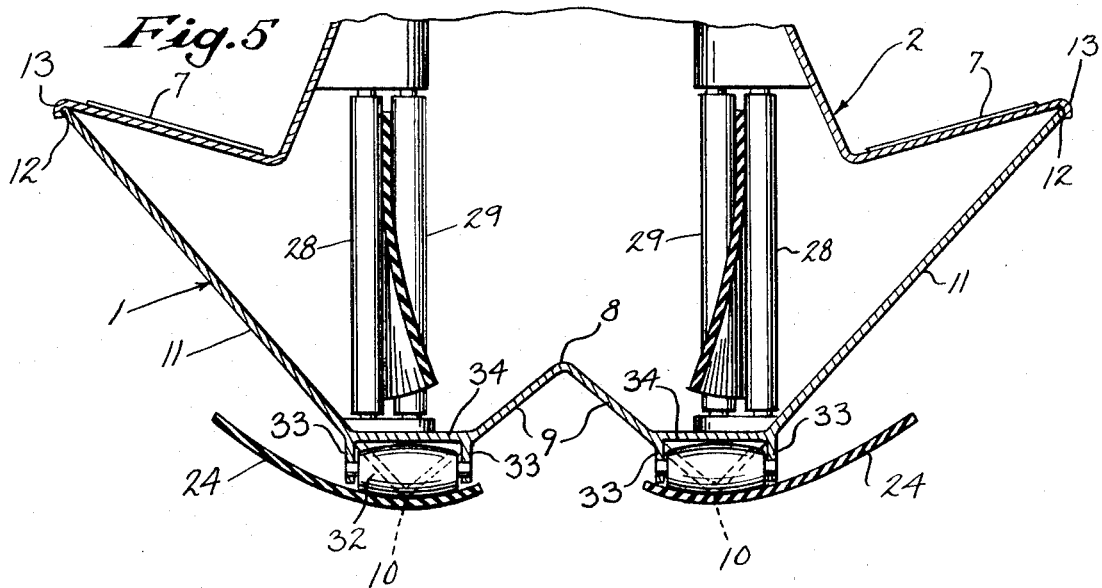
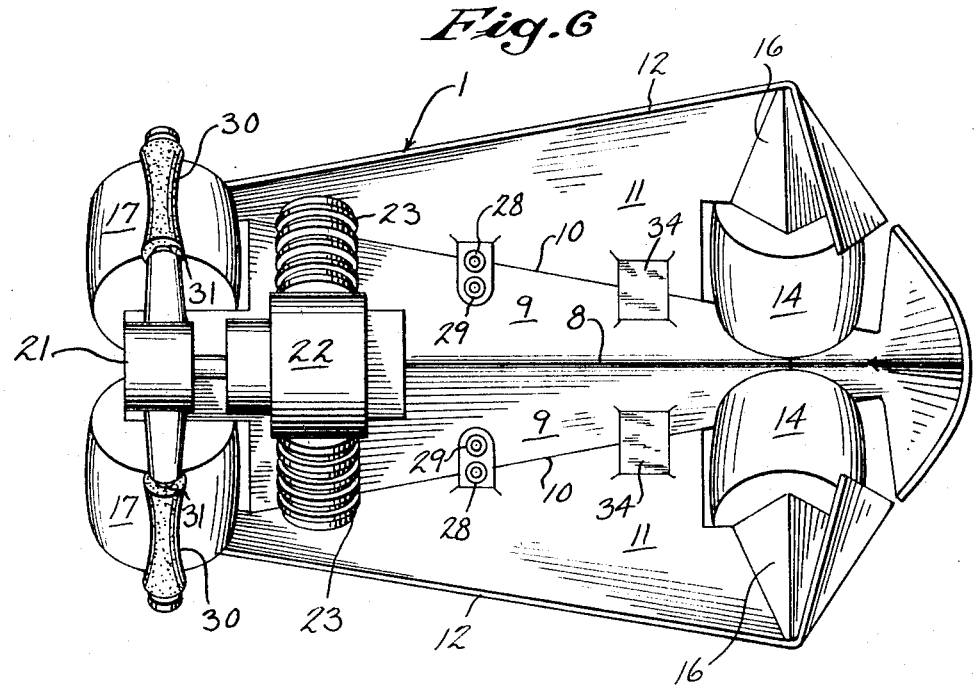
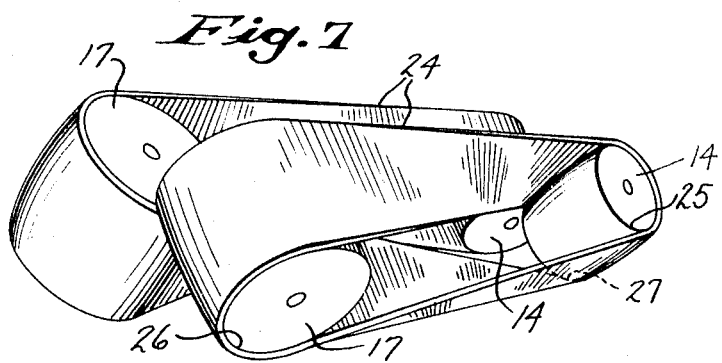
INVENTOR
ROBERT W. STOWERS
BY Arthur N. Seidel
ATTORNEY

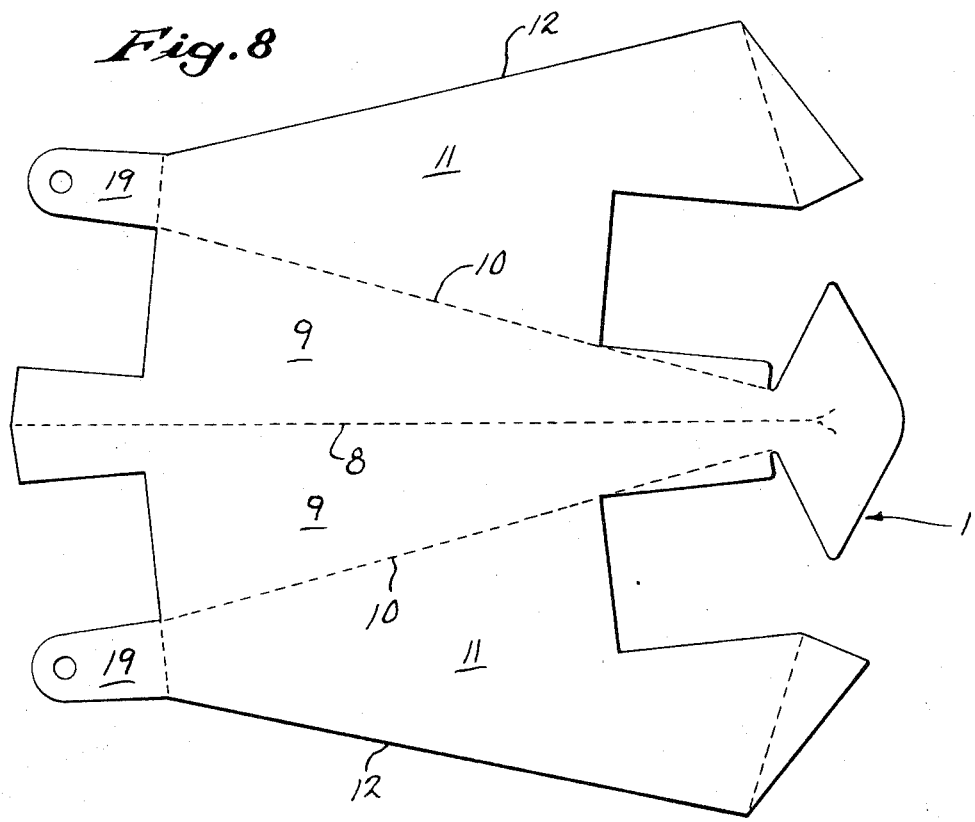
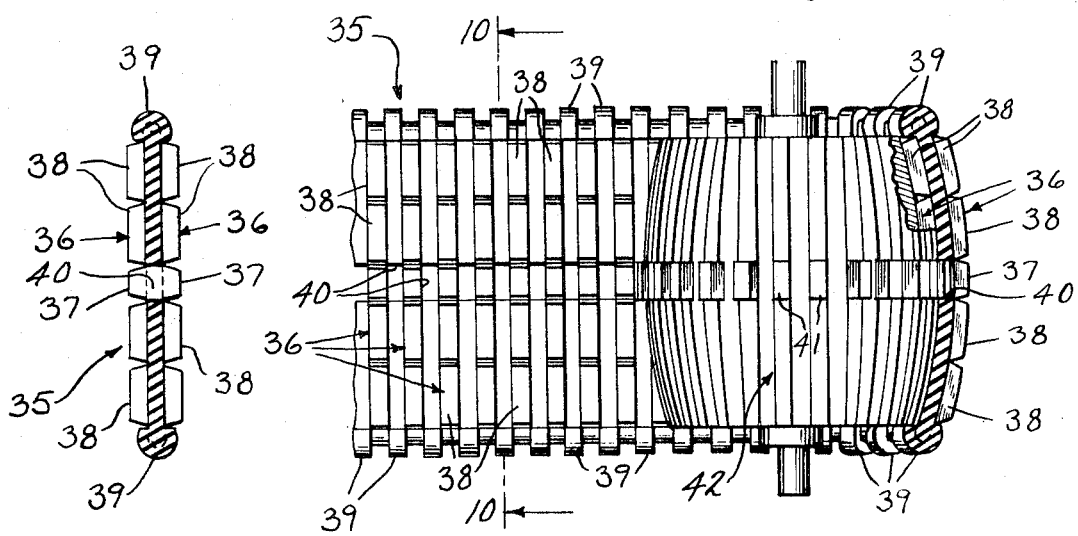

DUAL BELT VEHICLE

BACKGROUND OF THE INVENTION the present invention resides in a vehicle primarily intended as a single passenger snowmobile, although other uses and passenger capacity are within the contemplation of the practice of the invention. Snowmobiles as generally available are of multiple passenger size, or if designed for a single operator are of comparably large bulk and weight. They are usually propelled by a single belt located centrally on the machine that rides on the snow, and a steering mechanism including a rotatable column, handles at the top of the column and sleds or skis at the bottom is the usual construction for turning the vehicle. A smaller vehicle with less complex steering mechanism could be advantageously used by children, or adults who desire pleasure and sport riding. The invention disclosed herein is intended to fulfill such need.

SUMMARY OF THE INVENTION

In the preferred form, the invention has two driving belts, one on each side, that extend between rolls at the front and rear of the vehicle. A pair of rolls at the front have their axes canted to be convergent in a downward direction, and a pair of rolls at the rear have their axes canted to be convergent in an upward direction.

By providing belts that are each in the form of a moebius, and by locating the unusual twist of the moebius in the upper run of each belt, unique results are obtained. At the rear of the vehicle a space is developed between the two rear rolls that conveniently receives a prime mover, such as a gasoline engine, a clutch and a gearbox for driving the rear rolls. This driving mechanism may be elevated well above the ground or snow, and the driving connections with the rear rolls are at the raised ends of the rolls, so that the entire drive can be maintained at this elevated level. Chains extending down to the snow are eliminated, and the drive mechanism may be conveniently enclosed for purposes of safety to an operator and for freedom from clogging with foreign matter.

The canted roll axes create a twist, or warping in the lower run of each belt, so that the belt surface area in contact with the base medium on which the vehicle is run will be less than for a flat belt with a horizontal run. Hence, when the vehicle is operated on a hard packed snow the area of contact should be less than when operation is in a soft snow. Traction thus increases as necessary for obtaining forward thrust on a soft base.

A further advantage flowing from canted roll axes, in which the axially outer ends of the front rolls slant upward, is the resultant possibility of placing footboards immediately above the rolls that have a similar canted orientation. Foot pressure and body lean can then be sensed and regulated in connection with steering the vehicle. A compact machine is also made available that seats an operator at the high point of the vehicle at the rear above the prime mover, and with his legs comfortably bent and feet braced a body position is assumed that facilitates steering. Leaning to either side and foot pressure to control the lean can be readily coordinated for maneuvering the vehicle. This type of operation is exhilerating and provides sport to the user which enhances enjoyment of the device.

The steering of the vehicle may further be facilitated by the warp, or twist in the bottom runs of the belts. As the operator leans to tilt the vehicle the contact of the belts with the snow, or other base medium shifts and a turning motion should result. It is contemplated that the invention has the advantage of eliminating separate steering mechanism which adds to the expense and complexity of a snowmobile.

Further objects of the invention are to provide a snowmobile having a body chassis formed from a single piece of sheet material, and to have a compact vehicle suitable for a single person that can be transported in an automobile of the station wagon type and which can be easily lifted and moved from one position to another.

The foregoing and other objects and advantages of this invention will appear from the following description, in which description reference is made to the accompanying drawings which show by way of illustration and not of limitation specific preferred embodiments of the invention. Such embodiments do not represent the full scope of the invention, rather the invention may be employed in a variety of embodiments, and reference is made to the claims herein for interpreting the breadth of the invention.

BRIEF DESCRIPTION OF THE DRAWINGS

FIG. 3 is a view in cross section of the snowmobile as taken in the plane 3–3 indicated in FIG. 1, such view being on a scale larger than that of FIGS. 1 and 2, FIG. 4 is a rear view of the snowmobile, on the same scale as FIG. 3, in which the upper deck and tread belts of the machine have been removed for purposes of clarity, FIG. 5 is a view in cross section of the snowmobile taken in the plane 5–5 indicated in FIG. 1, such view being on the same scale as FIGS. 3 and 4, FIG. 6 is a plan view of the snowmobile that is similar to FIG. 2, but with the upper deck and the tread belts removed from the machine, FIG. 7 is a view in perspective of the rolls and tread belts of the machine taken from the rear and right-hand side, FIG. 8 is a layout of a single piece that forms, when folded, the chassis of the machine, FIG. 9 is a fragmentary view of an alternative form of a roll and tread belt which may be incorporated in the machine, and FIG. 10 is a view in cross section of the tread belt of FIG. 9 taken in the plane 10–10 indicated in FIG. 9.

DESCRIPTION OF THE PREFERRED EMBODIMENTS

Figure 1:
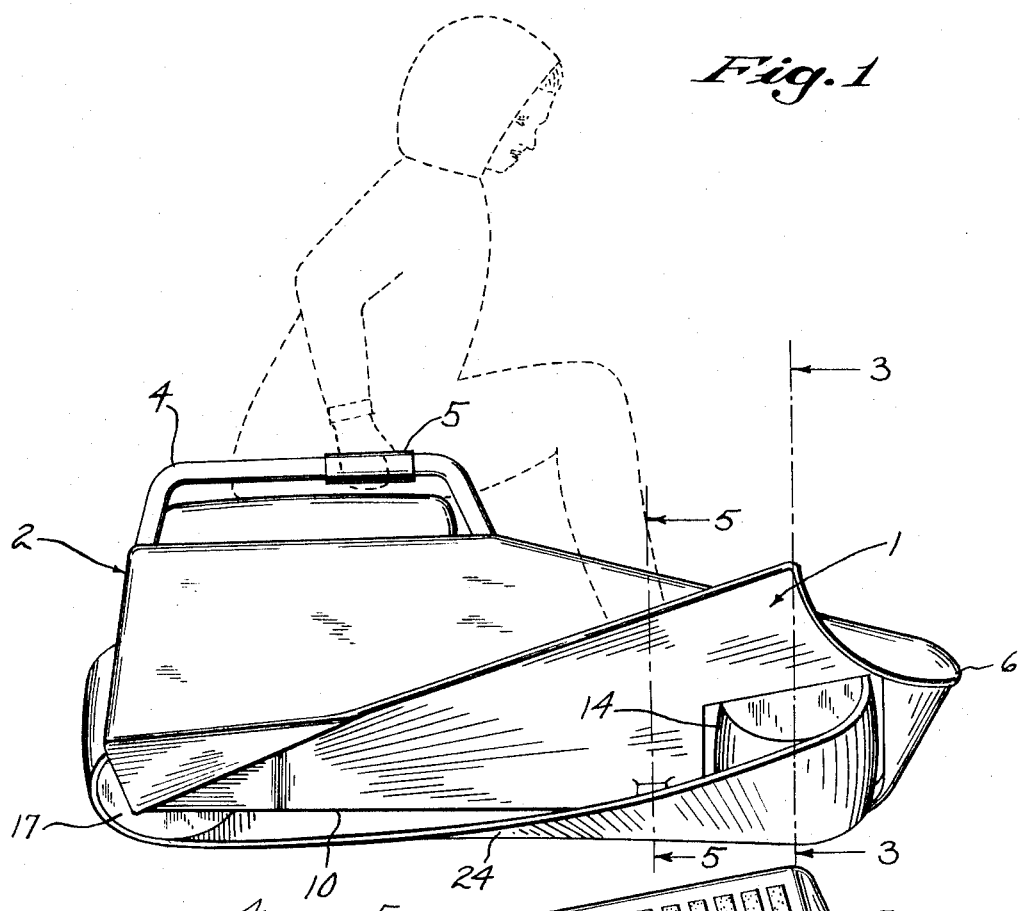
FIG. 1 is a side view in elevation of a snowmobile embodying the invention.

In the drawings there is disclosed a snowmobile of a size particularly suited for supporting and being operated by a single person. Such snowmobile has a body portion comprised of two principal components that are a chassis 1 that may be formed from a single sheet of steel having an outline configuration as shown in FIG. 8, and an upper deck 2 that fits over and covers the chassis 1. The upper deck 2 has a cushioned seat 3 at its rear which forms the uppermost portion of the body of the snowmobile, and on each side of the seat 3 is a handlebar 4. A rotatable grip section 5 is incorporated in each handlebar 4 for the purpose of controlling a gasoline engine that forms a part of the machine. One rotatable grip section 5 may function as a throttle control, and the other rotatable grip section 5 may function as a clutch control for engaging and disengaging the engine from driving relation to a pair of tread belts to be described.

Figure 2:
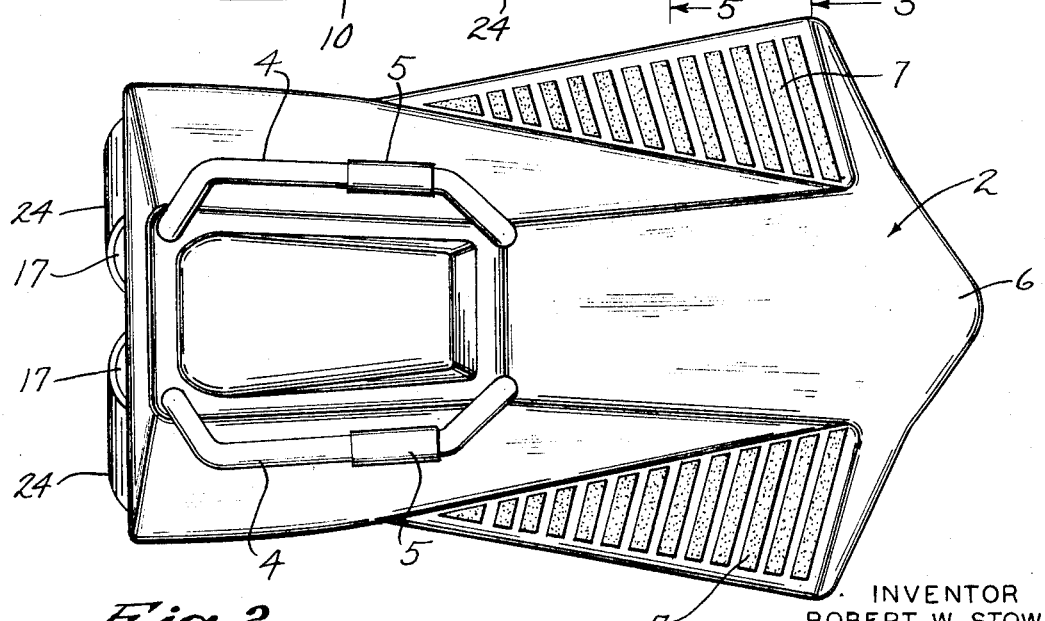
FIG. 2 is a plan view of the snowmobile of FIG. 1.

As viewed from the side, as in FIG. 1, the upper deck 2 slopes downwardly and forwardly from the seat 3 to a forward nose 6, and to each side of the forward slope rises an upwardly and sidewardly flaring footrest 7. The outline configuration of each footrest 7 is best seen in FIG. 2, where it is shown as a triangular shape broadening to the front and positioned behind the nose 6.

The chassis 1 is symmetrical about a centerline 8 and when folded into final form from the blank sheet of FIG. 8, such centerline 8 slops upwardly from a low point at the front of the machine. The chassis 1 is subdivided into a number of panel portions that are defined by folds in the sheet from which it is shaped. To each side of the centerline 8 is a first panel portion 9 that slopes downward from the centerline 8, as seen in FIGS. 3 and 5. The outer margin of each panel 9 terminates in a fold line 10, and from the line 10 an outer panel portion 11 slopes upward and sideward. The outer edges 12 of the outer panels 11 define the outer periphery of a portion of the chassis 1 that mates with the outer edge of the upper deck 2, with the upper deck 2 having a downwardly curved lip 13, as seen in FIGS. 3 and 5, which fits over the chassis to have a tight seal around the outside of the snowmobile body at the seam where the upper and lower body portions mate with one another.

At the front of the snowmobile a pair of rolls 14 is mounted, as most clearly shown in FIGS. 3 and 6. Each roll 14 has a canted axis that is convergent in a downwardly direction with the axis of the other roll 14. The two axes of the front rolls 14 lie in a vertical, transverse plane, with the lower end of each roll 14 being supported in a bearing 15 that is secured in the trough formed along the fold line 10 by the associated chassis panels 9 and 11. The upper end of each front roll 14 is bearingly supported in a pyramid-shaped member 16 that is fastened to the inside upwardly flaring front of the associated outer panel 11. The members 16 act not only as bearing housings, but as braces for the panel portions 11.

Mounted at the rear of the chassis 1 is a pair of rear rolls 17, the orientation of which is particularly shown in FIGS. 4, 6 and 7. These after rolls 17 are disposed symmetrically on each side of the machine centerline 8, with their axes lying in a vertical transverse plane and convergent with one another in an upwardly direction. The angle of cant of the axes of the after rolls 17 is such that on each side of the machine the axis of the rear roll 17 is perpendicular to the axis of the front roll 14. Also, in the particular embodiment of the drawings each roll axis is at an angle of approximately 45° from the horizontal.

A lower journal 18 extending from the lower end of each rear roll 17 is borne by a bearing supporting wing 19 forming a continuation of the after end of a panel portion 11, as seen in FIG. 8. A drive shaft 20 extends upwardly from each roll 17 and enters a gearbox 21 that is located directly behind g gasoline engine 22 that forms a prime mover for the vehicle. The gearbox 21 is mounted upon and firmly secured to the upper rear of the chassis panel portions 9 in a position that is astraddle the rear terminus of the centerline 8.

As shown in FIG. 6, he gasoline engine 22 is also mounted astraddle the centerline 8, in a position immediately to the front of the gearbox 21 and directly beneath the seat 3 of the upper deck 2. Engine cylinders 23 extend angularly downward alongside the sloping surfaces of the chassis panel portions 9 to nest within the chassis in a compact construction suitable for a single person vehicle.

A tread belt 24 is disposed on each side of the machine that extends between and passes around a front roll 14 and a rear roll 17. Each belt 24 is an endless belt fabricated in the geometrical form of a moebius, and the resulting unique combination of a moebius belt with canted rolls at right angles to one another is shown in perspective in FIG. 7. The view of FIG. 7 is taken from the starboard quarter, that is to say, slightly from the rear and the right-hand side of the assembly. Referring to the belt 24 on the right-hand side of the machine, and observing the lower run of the belt extending from the canted underside of the front roll 14 to the reverse canted underside of the rear roll 17, it is seen that the belt has a 90° twist as it passes rearwardly from the front to the rear. In this twist, the edge of the belt that passes over the upwardly facing edge 25 of the forward roll 14 drops downwardly to pass around the lowermost edge 26 of the after roll 17. The opposite edge of the belt 24, which passes around the lowermost downwardly facing edge 27 of the front roll 14 turns upwardly to pass around an upwardly facing edge of the after roll 17 that is not shown in the drawing of FIG. 7. Thus, the lower exposed bottom surface of the belt which is in contact with the base medium, such as snow, across which the vehicle moves changes its area of contact with such medium as it moves between the front and rear rolls.

The upper run of each belt 24 which extends forwardly from the rear roll 17 to the front roll 14 has the unique moebius twist incorporated into its extent. In this twist, the belt turns over so that which was the downwardly facing running surface of the belt in the lower run between the front and rear rolls now becomes the inner surface which is in engagement with the rolls 14, 17. A moebius is unique in that it has a single surface, so as one traces along its length he will cover the entire surface area and return to the point of origin. There are no two entirely separate surfaces, as in a normal belt. As a result, in the practice of the invention the surface of each tread belt 24 has the dual function of contacting the base medium over which the vehicle rides and of engaging each of the rolls 14, 17. One hundred percent of the surface area of each tread belt 24 is utilized for frictional contact with the medium upon which the vehicle moves. To accommodate the moebius belts 24, the rolls 14, 17 are crowned, or barrel shaped, so that distances between similar points on the rolls which are increased by canting are compensated.

A pair of guide rolls 28, 29, shown in FIGS. 5 and 6, are disposed on each side of the upper run of each tread belt 24 at a point medially between the front and rear rolls 14 and 17. These guide rolls 28, 29 are vertically disposed and are mounted in suitable bearings supported by the chassis 1 and the upper deck 2. The purpose of the rolls 28, 29 is to guide the moebius belt at the point of its distinguishing twist, or reversal to give stability to the belts and reduce vibration.

Referring now to FIGS. 4 and 6, mounted above each of the after rolls 17 is a rotatable cleaning brush 30 that has a shaft 31 at its upper end which extends into the gearbox 21 and is driven by suitable gearing within such box. Each brush 30 is in direct contact with a belt 24 and turns against the surface of the belt 24 as the belt travels up and around the rear roll 17. The belt surface is thus cleaned of any snow, ice or any other matter that may be adhering thereto, so that as it proceeds forwardly and twists to come into engagement with the forward roll 14 it will have a smooth passage around such forward roll.

In FIG. 5 there is shown an auxiliary roller 32 stationed directly behind each front roll 14 of a length that is only a minor part of the width of the associated belt 24. Each auxiliary roller 32 is supported by a pair of brackets 33 that are attached to the chassis 1 after shaping the blank of FIG. 8. A small roof 34 is built in above each auxiliary roller 32 to prohibit the entry of snow, ice, or other matter into the vehicle body. Each roller 32 functions to maintain belt position down in engagement with the medium over which the machine rides at a point in the width of the belt 24 that is lowermost in its twisted configuration. If desired, the bottom of the chassis 1 may be rounded and lowered along the fold lines 10 to provide curved surfaces that backup the belts 24 and retain them in the preferred, depressed position, A feature, seen from FIG. 6, is that the folds 10 lie immediately above the belts 24 in an angularly disposition across the belts to reinforce the belting along a line in which the belt should have primary contact with the base medium on which the vehicle rides. This disposition of the folds 10 is from the inner edge of the front rolls 14 to the outer edge of the rolls 17.

Referring now to FIGS. 9 and 10, there is shown a modified form of the tread belts and of a roller constructed to receive and drive such modified belts. The belt 35 in FIGS. 9 ad 10 is of flexible material, such as a suitable rubber or synthetic, which has integrally formed on both sides a plurality of tranversely extending, segmented ribs 36. Each rib 36 extends across the full width of the belt 35, and the ribs are successively spaced along the belt at equal distances from one another. Each rib 36 has a central segment 37 and then a plurality of separate segments 38 extending to the side which are flanked by edge beads 39. The ribs 36 are divided into segments to give the belts flexibility. There are openings 40 in the belt 35 between the central segments 37 which mesh with cogs 41 on a modified roll 42 as they pass around the roll 42. The ribs 36 fit, or mesh, with grooves in the surface of the roll 42, and thus, there is a positive drive between the belt 35 and the rolls, and there is also an enhanced traction with soft snow to propel the vehicle forward.

The vehicle described is intended for operation an a snowmobile, although it can be driven over other base media. The canted rolls accommodate the normal warping of the moebius belts, and the combination provides a running surface that varies in its contact area with the base medium in direct relation to the softness, or condition of such medium. The combination of canted rolls and moebius belts also provides a space at the rear of the vehicle which receives the prime mover and drive mechanism, so as to achieve a compact device. It is anticipated that the warp in the belts contacting the base medium will have a further benefit when it is a loose snow. The loose material may be worked in, under the vehicle to gain added support.

In the design of the rolls 14, 17 it is presently preferred to have the length of each roll approximate its maximum diameter, to have all rolls of the same dimensions, and to have the midpoint of the axis of each front roll 14 coincide with the midpoint of the axis of the associated rear roll 17 on a direct fore-and-aft line. Then, the theoretically lowermost portions of each belt that ride upon a base medium will gall in a direct fore-and-aft line, and if the fold lines 10 are dropped to a low position to support the belts they will more nearly follow a direct fore-and-aft line than those illustrated in FIG. 6.

In conclusion, the invention presents a novel vehicle for use primarily by single users, and to this end it can be manufactured in small sizes that can be lifted aboard station wagons and the like for ready transport to and from areas of use.

I claim:
1. In a vehicle the combination comprising:
a chassis;
a pair of rolls at one end of the chassis with the axes thereof convergent downwardly;
a second pair of rolls at the other end of the chassis with their axes convergent upwardly; and
a pair of belts extending along the chassis, each turning around one of the pair of rolls at one end and one of the pair of rolls at the other end and having a twist in its lower run between rolls.

2. A vehicle as in claim 1 wherein the axes of each pair of rolls are at substantially 90° to one another, and the axes of the rolls on a side of the machine are also at substantially 90° to one another.

3. In a vehicle the combination comprising:
a chassis;
a pair of rolls at one end of the chassis with the axes thereof convergent downwardly;
a second pair of rolls at the other end of the chassis with their axes convergent upwardly; and
a pair of belts extending along the chassis, each turning around one of the pair of rolls at one end and one of the pair of rolls at the other end, and wherein each belt is in the form of a moebius.

4. In a vehicle the combination comprising:
a pair of rolls at the forward end of the vehicle, one to each side of a vehicle centerline; a second pair of rolls at the after end of the vehicle, one to each side of the vehicle centerline;
the axis of the pair of rolls at one end being, in a transverse vertical plane, convergent downwardly and at an angle to the axis of the rolls at the other end; and
a pair of belts extending along the vehicle each turning around one of the pair of rolls at the forward end and one of the pair of rolls at the after end and also having a twist in its lower run between rolls.

5. In a vehicle the combination comprising:
a pair of rolls at the forward end of the vehicle, one to each side of a vehicle centerline;
a second pair of rolls at the after end of the vehicle, one to each side of the vehicle centerline;
the axis of the pair of rolls at one end being, in a transverse vertical plane, convergent downwardly; and
a pair of belts extending along the vehicle each turning around one of the pair of rolls at the forward end and one of the pair of rolls at the after end, and wherein each belt is in the form of a moebius.

6. A vehicle as in claim 5, wherein the rolls have lengths approximately the same as the diameters thereof.

7. In a vehicle the combination comprising:
a pair of rolls at the forward end of the vehicle, one to each side of a vehicle centerline;
a second pair of rolls at the after end of the vehicle, one to each side of the vehicle centerline;
the axis of the pair of rolls at one end being convergent upwardly and at an angle to the axis of the other pair of rolls, and there being a substantial space between the upper ends of such rolls;
drive mechanism mounted on the vehicle in said space and connected in driving relation to said pair of convergent rolls; and
a pair of belts, one on each side of the vehicle that extends between a roll at the front and a roll at the rear of the vehicle and that has a twist in its length conforming to the angular relation of roll axes.

8. In a vehicle the combination comprising:
a pair of rolls at the forward end of the vehicle, one to each side of a vehicle centerline;
a second pair of rolls at the after end of the vehicle, one to each side of the vehicle centerline;
the axis of the pair of rolls at one end being convergent upwardly and there being a substantial space between the upper end of such rolls;
drive mechanism mounted on the vehicle in said space and connected in driving relation to said pair of convergent rolls; and
a pair of belts, one on each side of the vehicle that extends between a roll at the front and a roll at the rear of the vehicle, and wherein each belt is in the form of a moebius.

9. A vehicle as in claim 8 wherein cleaning rolls bearing against said belts are mounted alongside said pair of convergent rolls.

10. A vehicle as in claim 8 wherein the rolls have lengths approximately the same as the diameters thereof.

11. In a vehicle the combination comprising:
a pair of rolls at the forward end that are abreast one another with one at each side of the vehicle and which have their axes canted with respect to one another; a pair of rolls at the after that are abreast one another with one at each side of the vehicle and which have their axes canted in a reverse direction from that of the forward rolls;
a pair of belts, one extending between the rolls on one side of the vehicle and the other extending between the rolls on the other side of the vehicle;
drive mechanism mounted between the belts toward the after end of the vehicle that is in driving connection with the rolls at the after end;
an upper deck extending over the belts and driving mechanism presenting a seat toward the rear and above the driving mechanism and presenting footboards to the front of the seat and at the sides of the vehicle; and
handgrips at the sides of the seat.

12. A vehicle as in claim 11 having a chassis which comprises on each side of a centerline thereof;
a first panel angling down from the centerline with its edge along the centerline rising from the front to the rear of the vehicle, said first panel having an outer edge above a belt that extends generally from the inside end of a front roll to the outside end of a rear roll; and
a second panel forming a sideward continuation of the first panel that angles upward from the outer edge of the first panel, and which extends from a front roll to an after roll and supports outer bearings for the rolls.

13. In a vehicle the combination comprising:
a pair of rolls at the forward end that are abreast one another with one at each side of the vehicle;
a pair of rolls at the after end that are abreast one another with one at each side of the vehicle and with their axes convergent upwardly;
a pair of belts, one extending between the rolls on one side of the vehicle and the other extending between the rolls on the other side of the vehicle, said belts each being in the form of a moebius;
drive mechanism mounted between the belts toward the after end of the vehicle that is in driving connection with the rolls at the after end;

an upper deck extending over the belts and driving mechanism presenting a seat toward the rear and above the driving mechanism and presenting footboards to the front of the seat and at the sides of the vehicle; and handgrips at the sides of the seat.

14. A vehicle as in claim 13 wherein the pair of rolls at the forward end have their axes convergent downwardly.

15. A vehicle as in claim 14, wherein footrests are provided over the upper ends of said rolls at the forward end.

16. In a vehicle the combination comprising:
a chassis formed from sheet material having a centerline that rises from the front to the rear of the vehicle, a first panel on each side of the centerline that angles downward from the centerline to a lower edge and which is widest at the rear of the chassis, and a second panel forming a sideward continuation from the lower edge of each first panel which slopes upward to form a trough with the associated first panel and which is widest at the front of the chassis;

rolls mounted at the front and rear of each side of the chassis;

belts between the rolls that lie beneath the trough on each side of the chassis; and an upper closing over the chassis with a seat at the central rear, and footboards at the front sides thereof.